(12) United States Patent
Pahwa et al.

(10) Patent No.: US 9,303,884 B2
(45) Date of Patent: Apr. 5, 2016

(54) SYSTEM AND METHOD FOR IMPROVING THE PERFORMANCE OF DESICCANT DEHUMIDIFICATION EQUIPMENT FOR LOW-HUMIDITY APPLICATIONS

(75) Inventors: Deepak Pahwa, Delhi (IN); Rajan Sachdev, Delhi (IN); William Charles Griffiths, Palm Beach Gardens, FL (US); Kuldeep Singh Malik, New Delhi (IN)

(73) Assignee: BRY AIR [ASIA] PVT. LTD., Delhi (IN)

( * ) Notice: Subject to any disclaimer, the term of this patent is extended or adjusted under 35 U.S.C. 154(b) by 156 days.

(21) Appl. No.: 13/806,525

(22) PCT Filed: Jun. 20, 2011

(86) PCT No.: PCT/IN2011/000412
§ 371 (c)(1),
(2), (4) Date: Mar. 11, 2013

(87) PCT Pub. No.: WO2011/161693
PCT Pub. Date: Dec. 29, 2011

(65) Prior Publication Data
US 2013/0160644 A1    Jun. 27, 2013

(30) Foreign Application Priority Data
Jun. 22, 2010    (IN) ............................ 1446/DEL/2010

(51) Int. Cl.
*B01D 53/06* (2006.01)
*F24F 3/14* (2006.01)
*B01D 53/26* (2006.01)

(52) U.S. Cl.
CPC .............. *F24F 3/1423* (2013.01); *B01D 53/06* (2013.01); *B01D 53/261* (2013.01);
(Continued)

(58) Field of Classification Search
CPC ............... B01D 53/06; B01D 53/261; B01D 2251/302; B01D 2251/60; B01D 2253/106; B01D 2253/112; B01D 2253/116; B01D 2257/80; B01D 2258/06; F24F 3/1423; F24F 2203/1088; F24F 2203/1032; F24F 2203/1036; F24F 3/1092
USPC .......... 95/113–115; 96/125, 126, 131; 34/472, 34/473, 80; 62/94, 271
See application file for complete search history.

(56) References Cited

U.S. PATENT DOCUMENTS

| 4,729,774 A | 3/1988 | Cohen et al. |
| 5,158,582 A * | 10/1992 | Onitsuka et al. ............... 95/129 |

(Continued)

FOREIGN PATENT DOCUMENTS

| DE | 39 02 977 | 8/1989 |
| JP | 5 115736 | 5/1993 |

(Continued)

*Primary Examiner* — Frank Lawrence
(74) *Attorney, Agent, or Firm* — Leason Ellis LLP

(57) ABSTRACT

A method and apparatus for energy-efficient desiccant dehumidification of air or other gases to low humidity levels is disclosed. The method and apparatus includes a desiccant rotor (wheel) having more than one dehumidification zone or sector. Separate dehumidification sectors may be used to dehumidify separate air or gas streams, or they may be used to dehumidify a single air or gas stream by passing it through more than one sector. All or a portion of the discharge air or gas from a dehumidification sector is used for all or a portion of reactivation inlet air or gas prior to heating. The desiccant wheel may include more than one reactivation sector, with separate air or gas sources for each sector. The desiccant wheel may include a purge sector between the reactivation and dehumidification sectors to improve the thermal efficiency of the dehumidification process.

26 Claims, 17 Drawing Sheets

(52) U.S. Cl.
CPC ...... *B01D 2251/302* (2013.01); *B01D 2251/60* (2013.01); *B01D 2253/106* (2013.01); *B01D 2253/112* (2013.01); *B01D 2253/116* (2013.01); *B01D 2257/80* (2013.01); *B01D 2258/06* (2013.01); *F24F 2203/1088* (2013.01); *F24F 2203/1092* (2013.01)

(56) References Cited

U.S. PATENT DOCUMENTS

| | | | | |
|---|---|---|---|---|
| 5,667,560 | A | * | 9/1997 | Dunne .............................. 95/113 |
| 5,758,508 | A | * | 6/1998 | Belding et al. .................... 62/94 |
| 2005/0204914 | A1 | * | 9/2005 | Boutall ............................. 95/10 |
| 2009/0139254 | A1 | * | 6/2009 | Landry ............................. 62/271 |
| 2010/0275775 | A1 | * | 11/2010 | Griffiths et al. .................. 95/18 |

FOREIGN PATENT DOCUMENTS

| | | |
|---|---|---|
| JP | 5 200233 | 8/1993 |
| JP | 6 343818 | 12/1994 |
| JP | 6 343819 | 12/1994 |
| JP | 2003 144831 | 5/2003 |
| JP | 2003 144832 | 5/2003 |
| JP | 2004 148255 | 5/2004 |
| JP | 2006 035188 | 2/2006 |

* cited by examiner

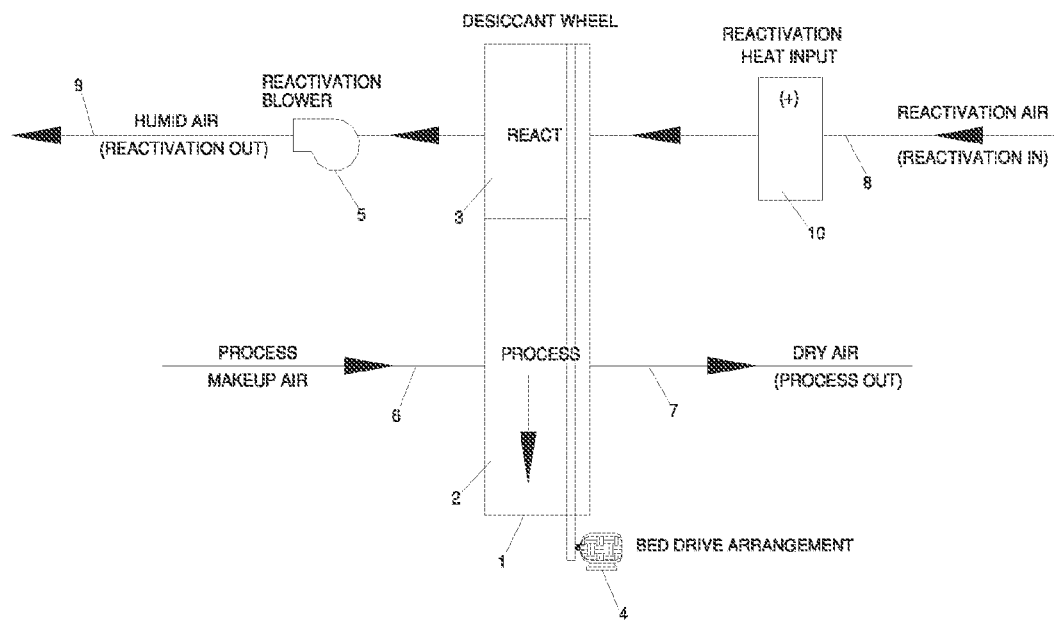
FIG.1 - BASIC DRY DESSICANT DEHUMIDIFIER
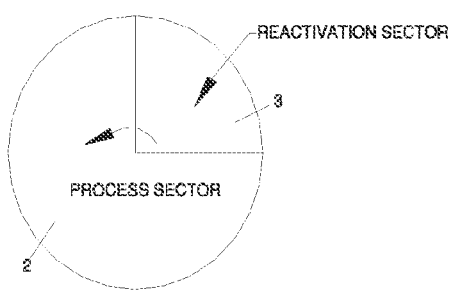
(Prior Art)

FIG.2 - DESICCANT ISOTHERM CLASSIFICATIONS
TYPICAL ISOTHERM
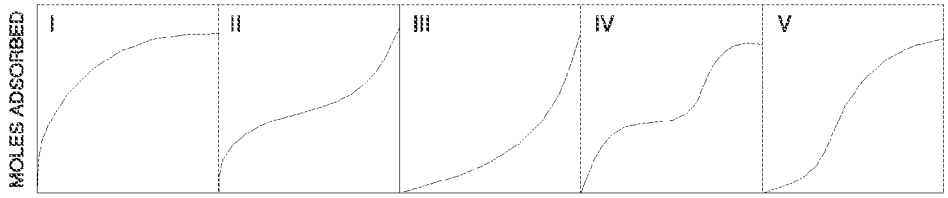
FIG.NO-2(a)
BRUNAUER CLASSIFICATIONS OF ISOTHERMS
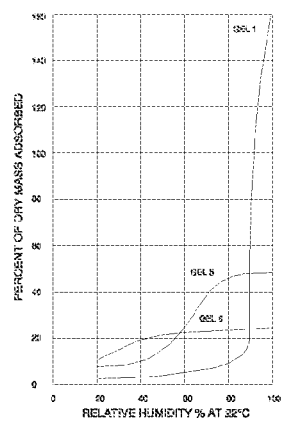
FIG.NO-2(b) ADSORPTION AND STRUCTURAL CHARACTRICS OF SOME EXPERIMENAL SILICAGELS
2009 ASHARE HANDBOOK-FUNDAMENTAL
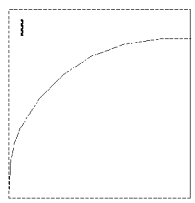
FIG.NO-2(c)
TYPICAL ISOTHERM OF MICROPOROUS DESICCANT (TYPE-I)
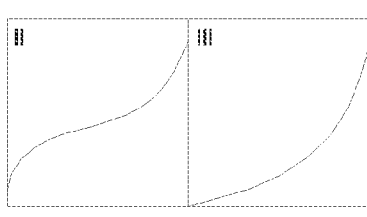
FIG.NO-2(d)
TYPICAL ISOTHERM OF MACROPOROUS DESICCANT (TYPE-II & III)
(Prior Art)

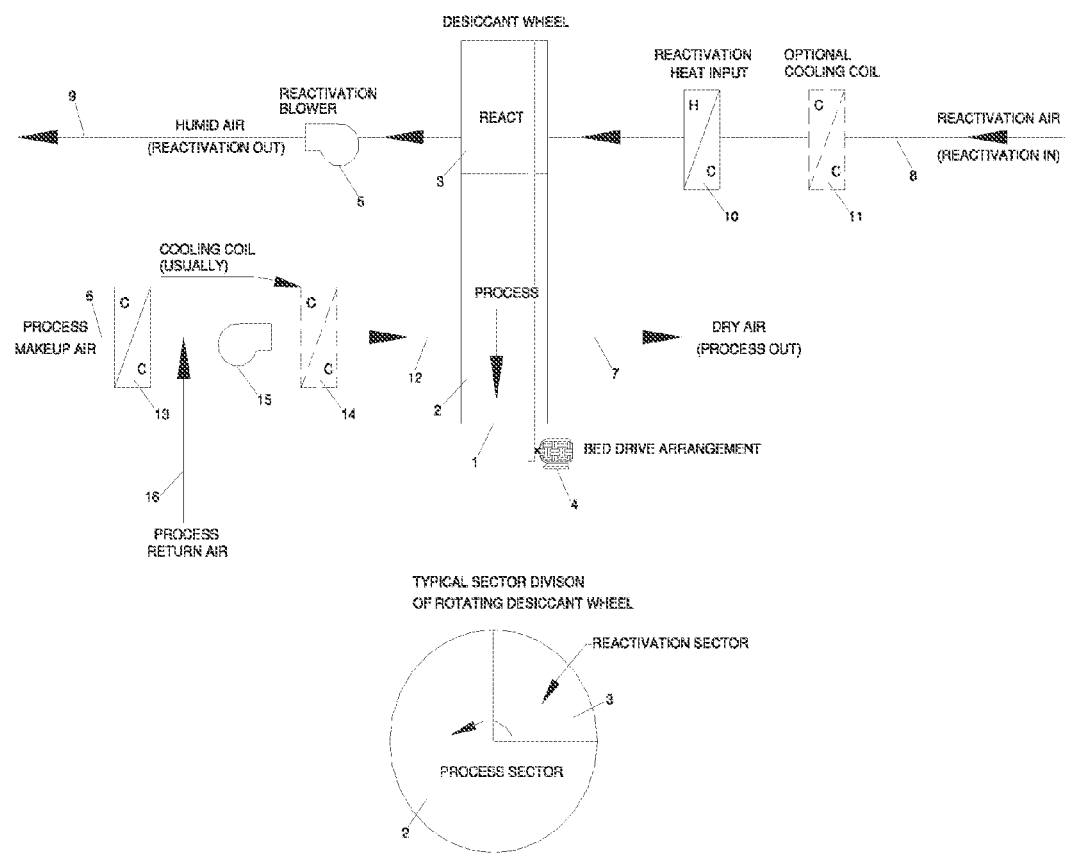
(Prior Art)

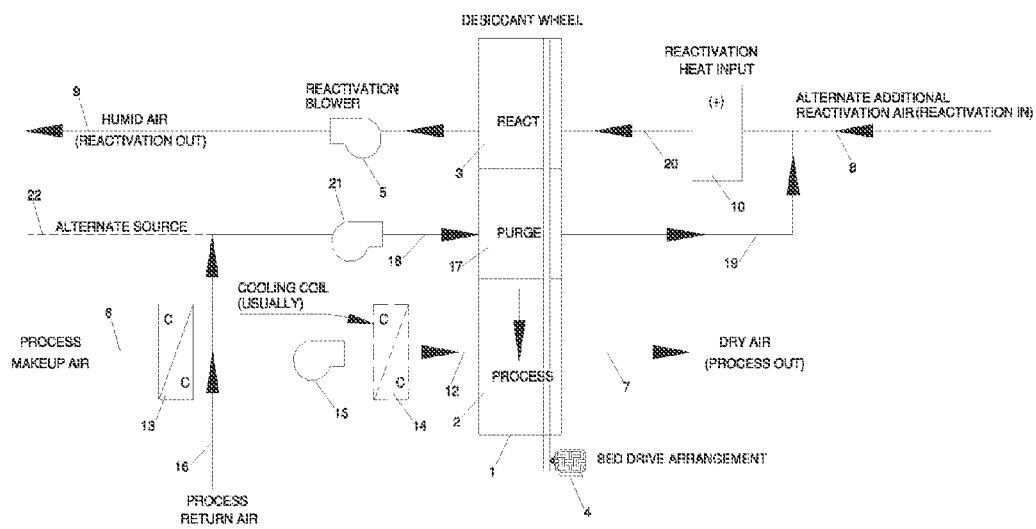
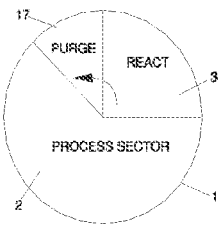
(Prior Art)

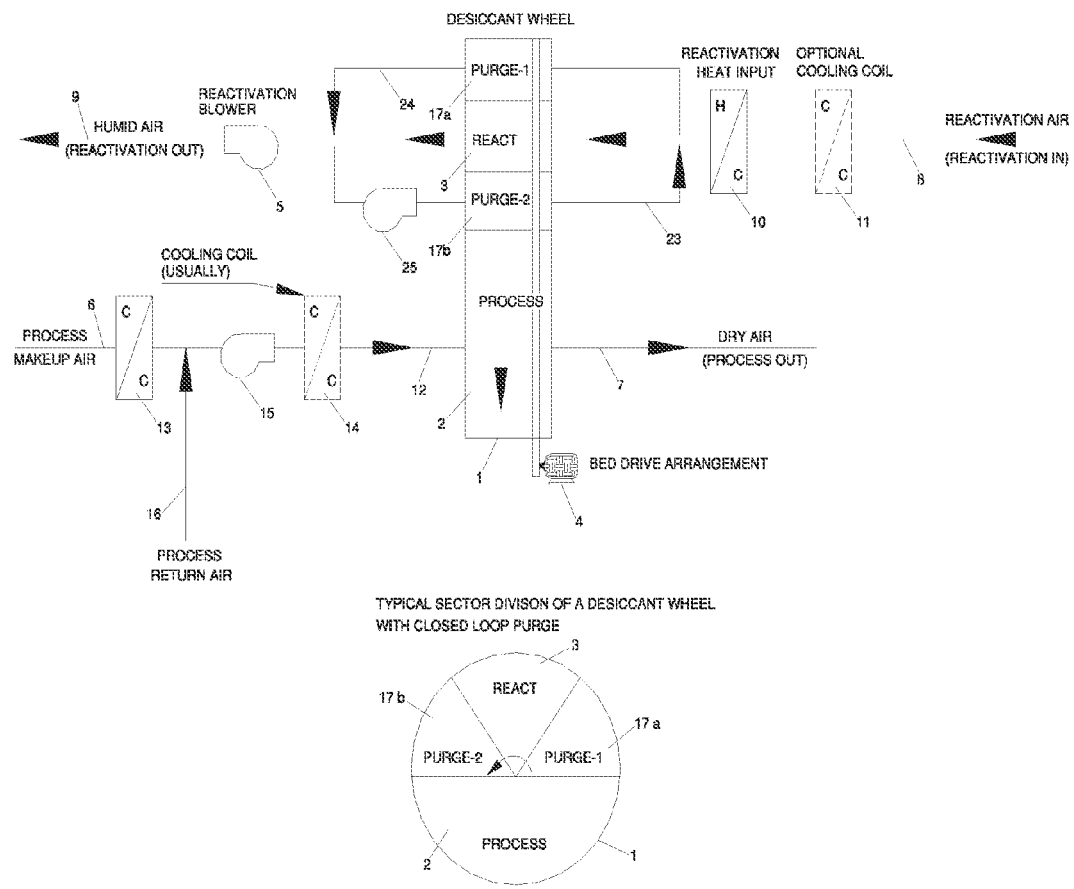
(Prior Art)

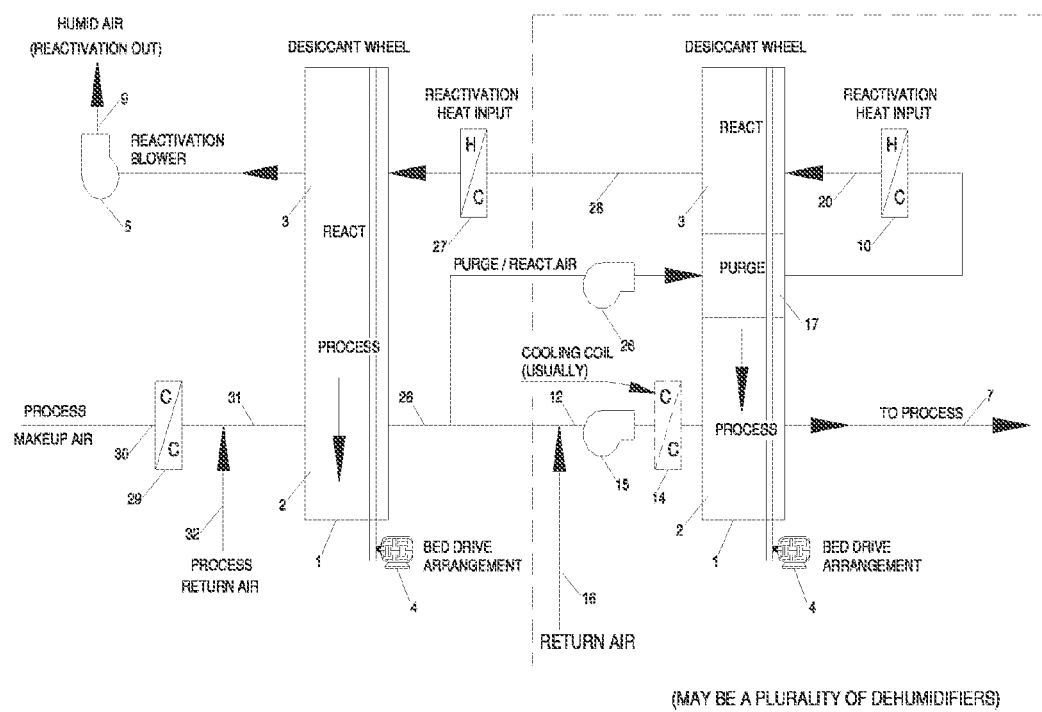
(Prior Art)

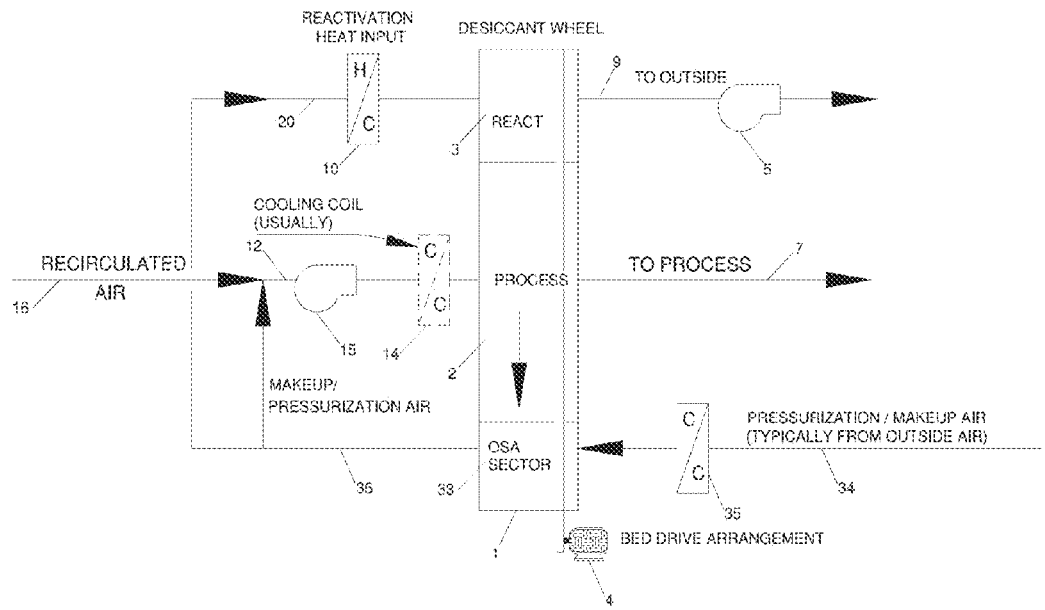
FIG.7 - DRY PURGE CYCLE WITH RECIRCULATED AIR
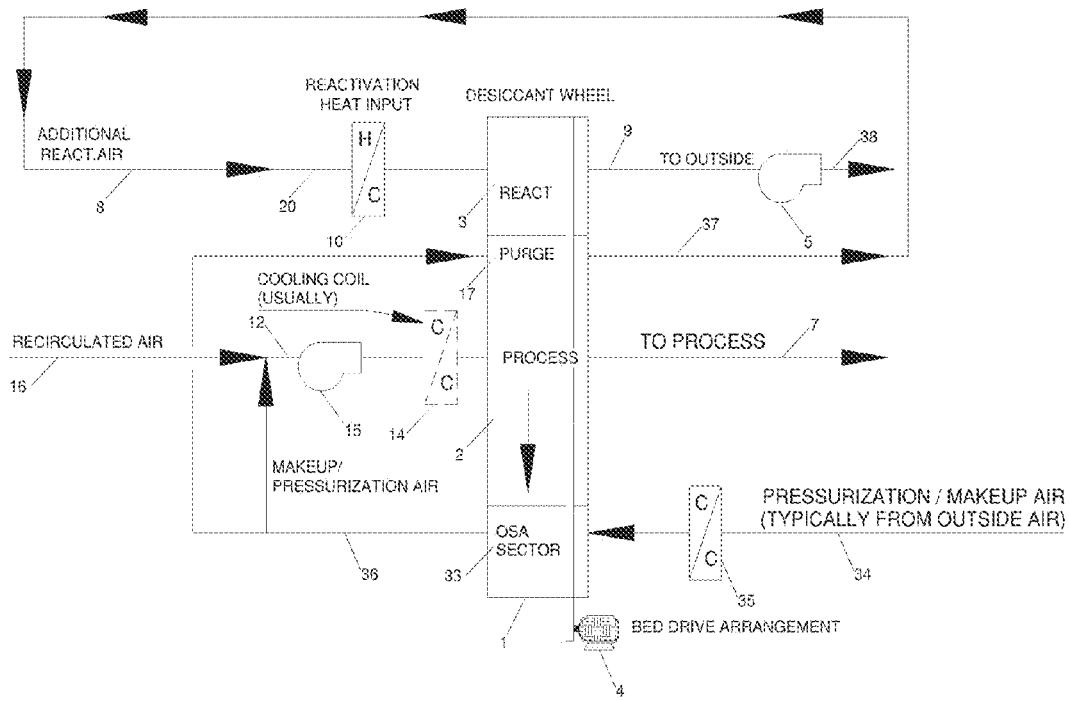
FIG.7(A) - DRY PURGE CYCLE WITH RECIRCULATED AIR AND ADDITIONAL PURGE SECTOR

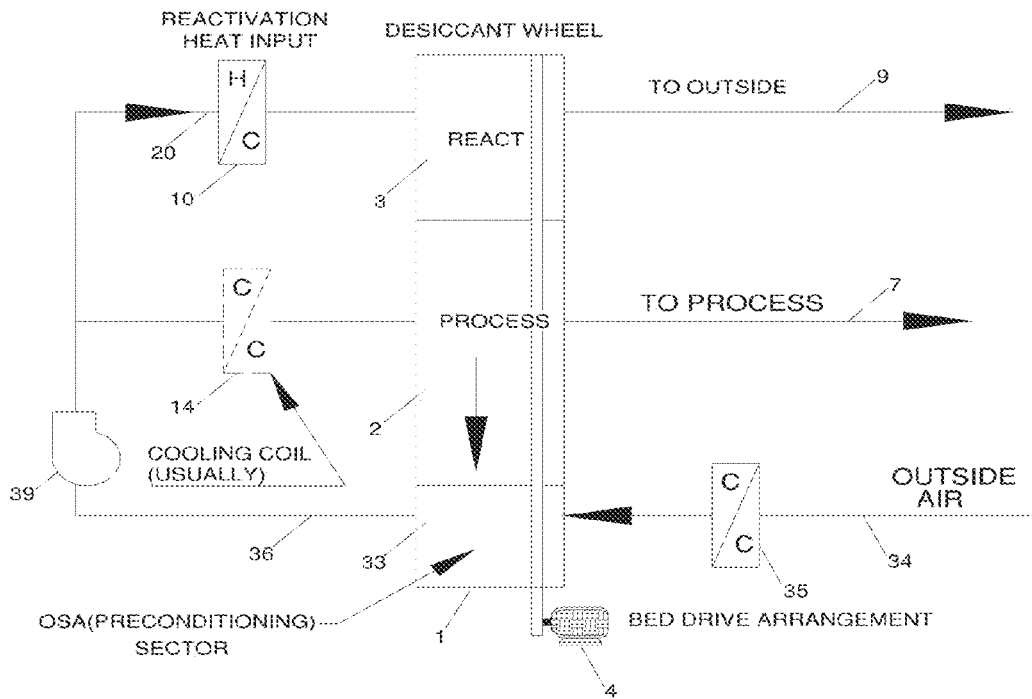
FIG.8 - DRY PURGE CYCLE FOR 100% OUTSIDE AIR
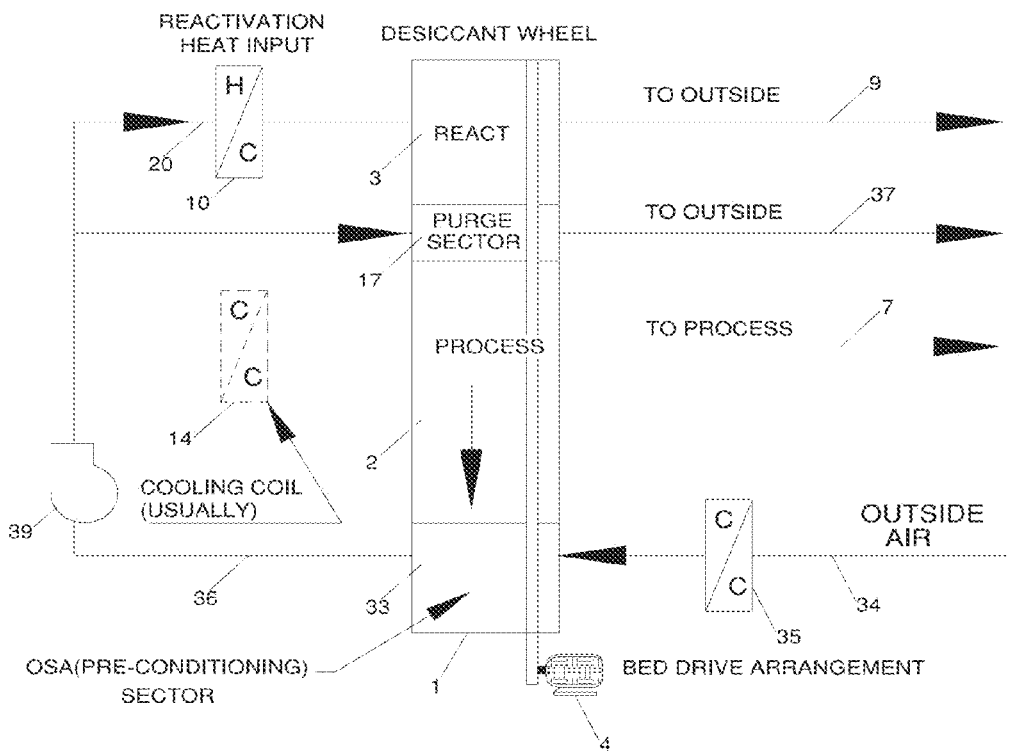
FIG.8(A) - DRY PURGE CYCLE WITH 100% OUTSIDE AIR AND ADDITIONAL PURGE SECTOR FIG. 9 - DRY PURGE CYCLE WITH ONCE THROUGH OR RECIRCULATED AIR / GAS
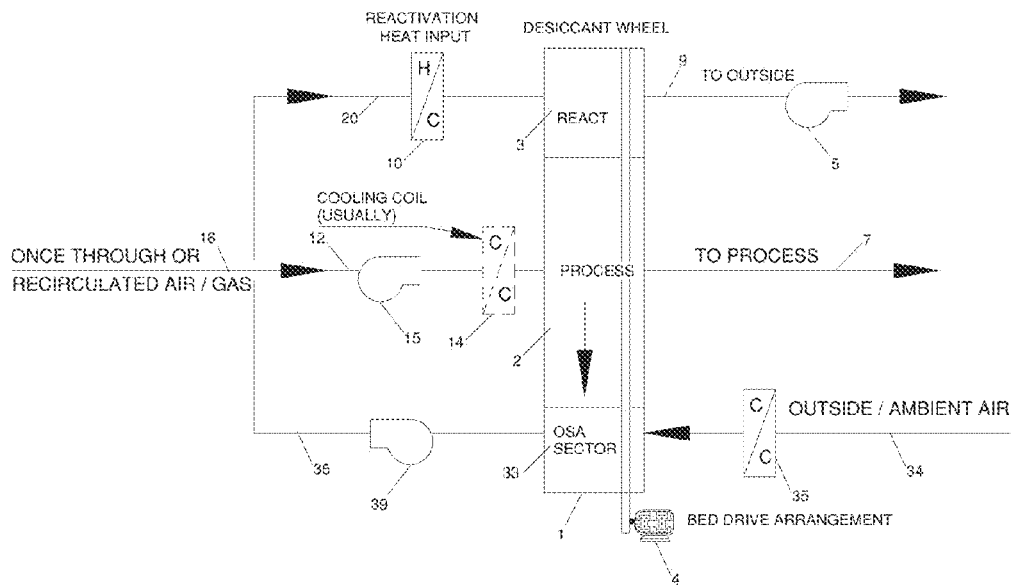
FIG. 9(A) - DRY PURGE CYCLE WITH ONCE THROUGH OR RECIRCULATED AIR / GAS, WITH ADDITIONAL PURGE SECTOR
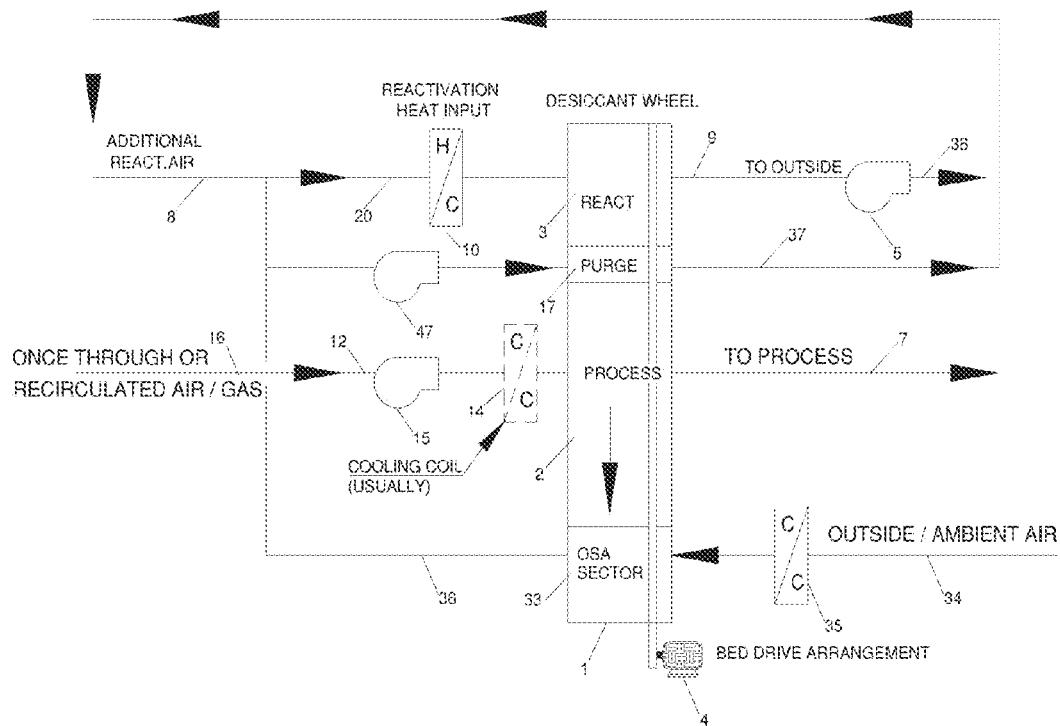

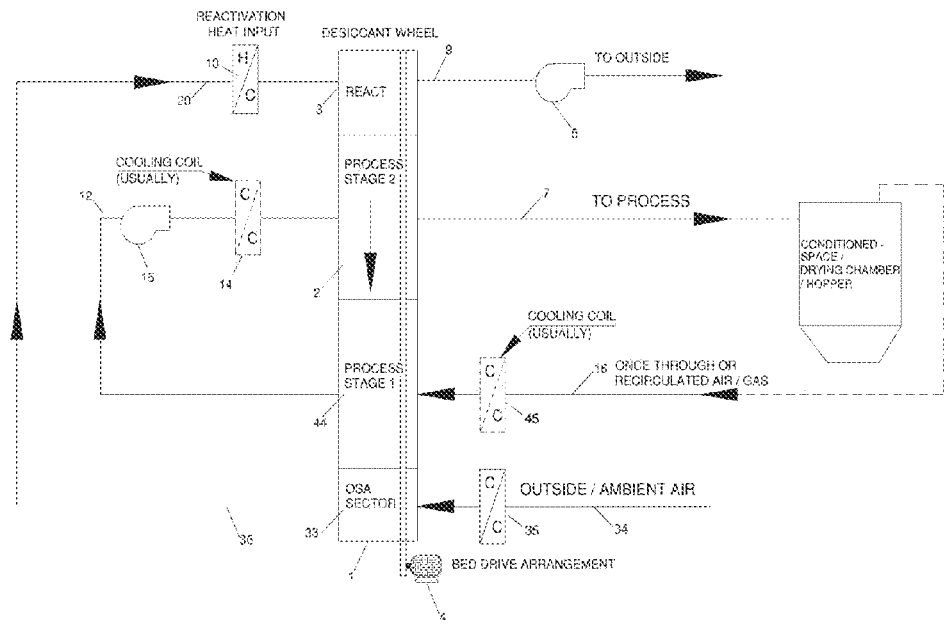
FIG.10 - DRY PURGE CYCLE WITH ONCE THROUGH OR RECIRCULATED AIR / GAS.
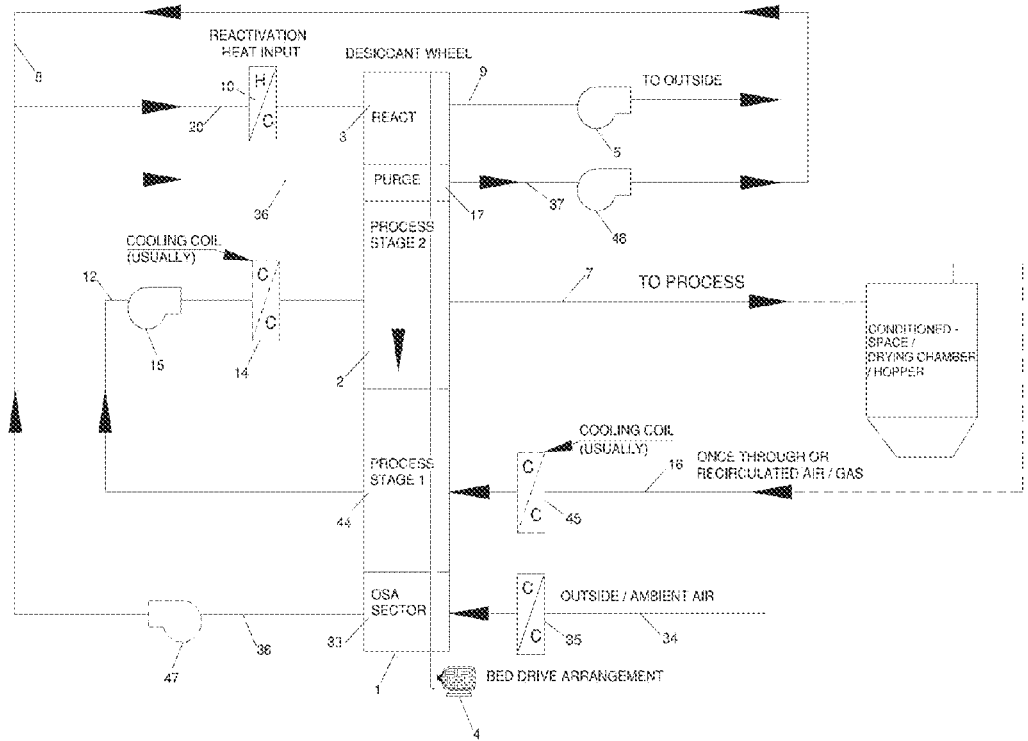
FIG.10(A) - DRY PURGE CYCLE WITH ONCE THROUGH OR RECIRCULATED AIR / GAS. AND ADDITIONAL PURGE SECTOR

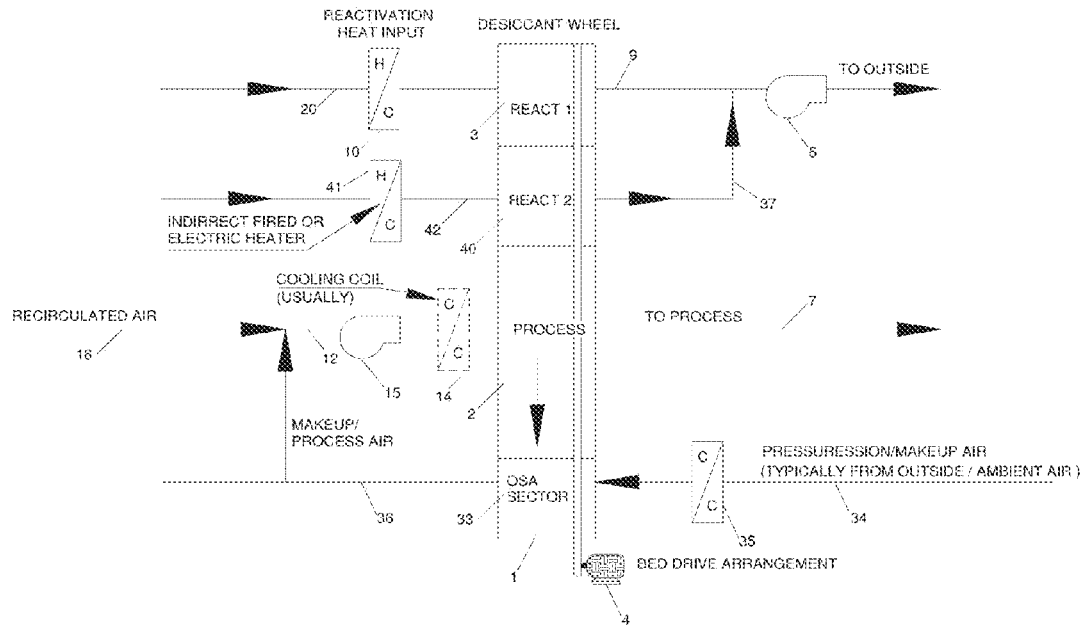
FIG.11(A) - DRY PURGE CYCLE WITH RECIRCULATED AIR WITH TWO STAGE REACTIVATION
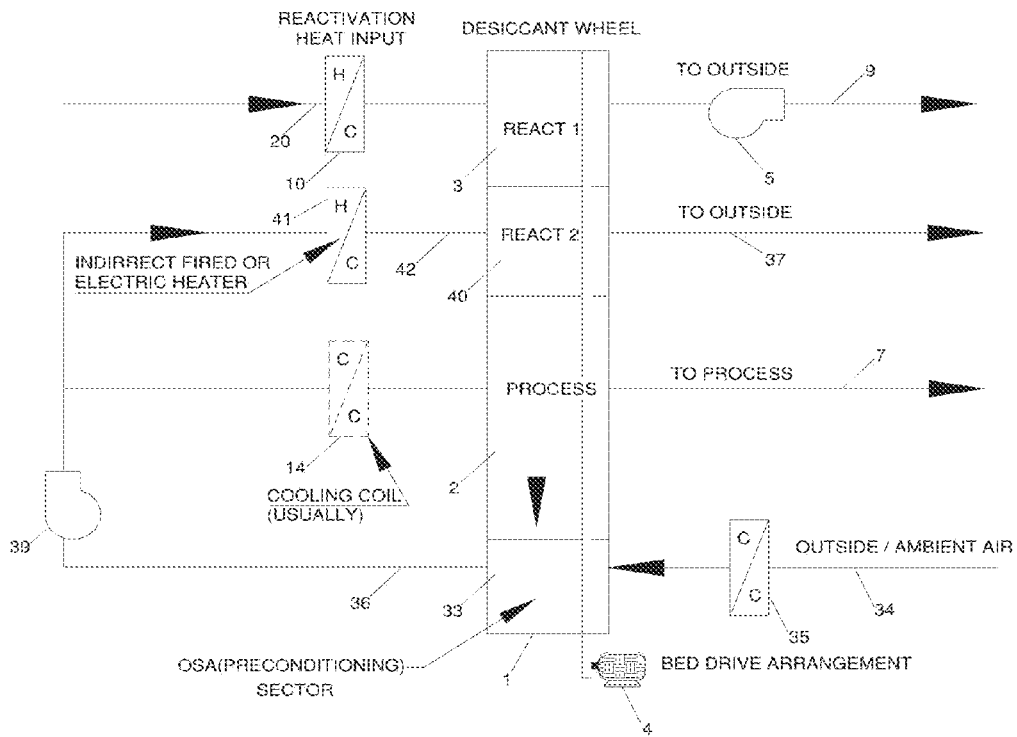
FIG.11(B) - DRY PURGE CYCLE FOR 100% OUTSIDE AIR WITH TWO STAGE REACTIVATION

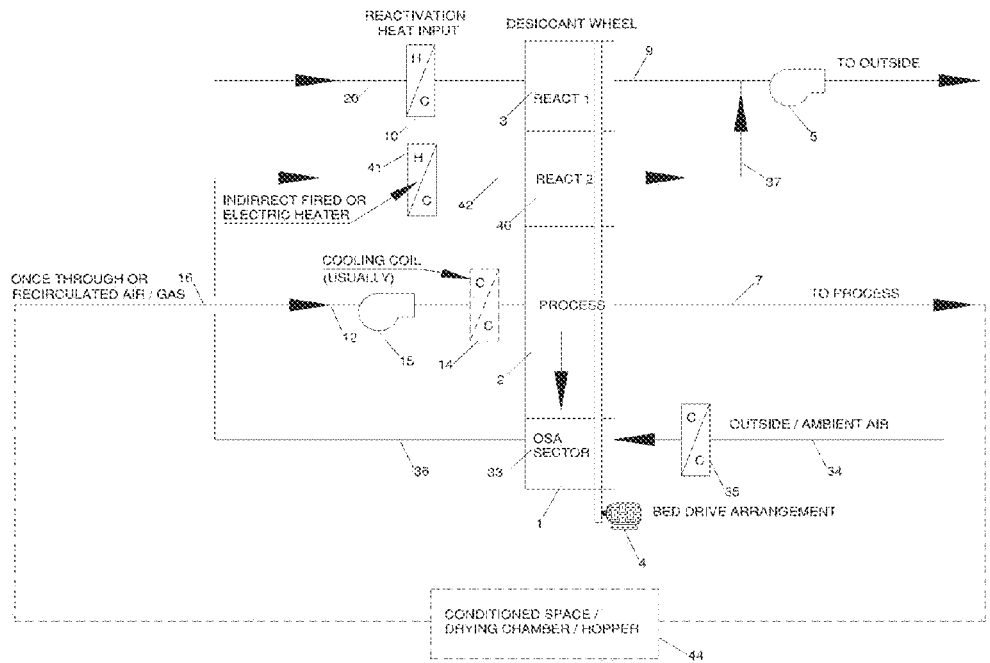
FIG.11(C) - DRY PURGE CYCLE WITH ONCE THROUGH OR RECIRCULATED AIR / GAS, WITH TWO STAGE REACTIVATION
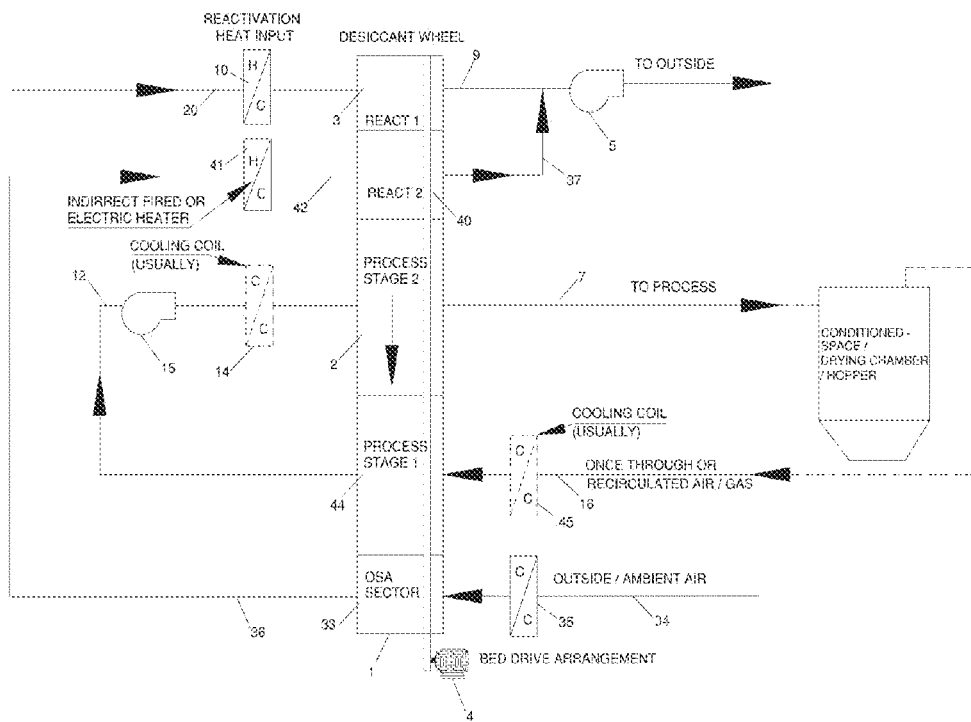
FIG.11(D) - DRY PURGE CYCLE WITH ONCE THROUGH OR RECIRCULATED AIR / GAS, WITH TWO STAGE REACTIVATION FIG.12 - TYPE II DESICCANT ISOTHERM WELL-SUITED FOR THE PRESENT INVENTION
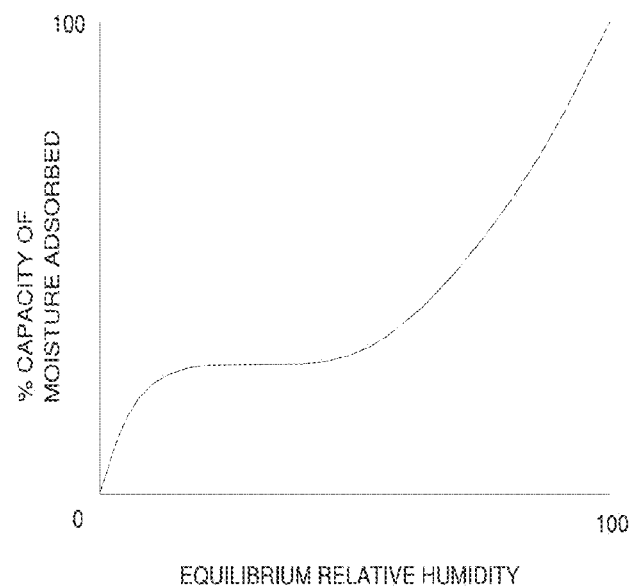
FIG.13 - ADSORPTION WAVE-PRESSUREATION / MAKEUP AIR SECTOR
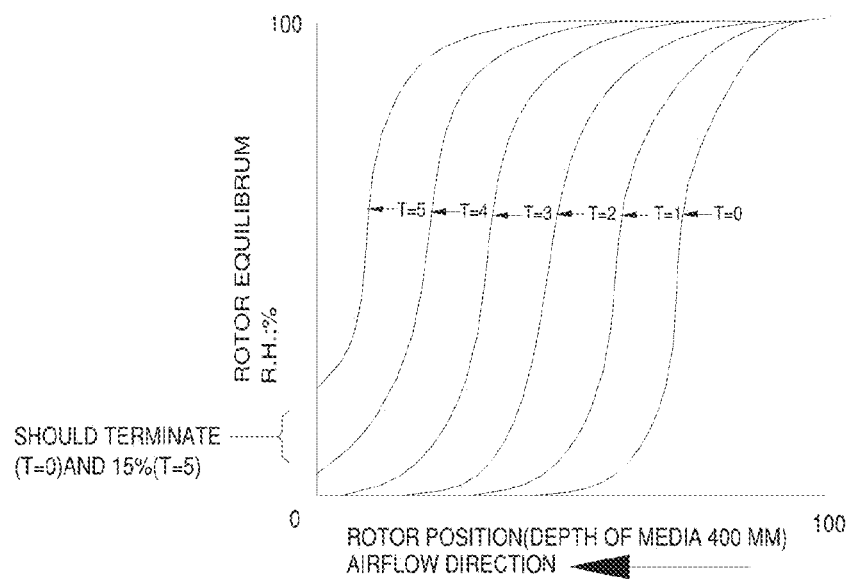

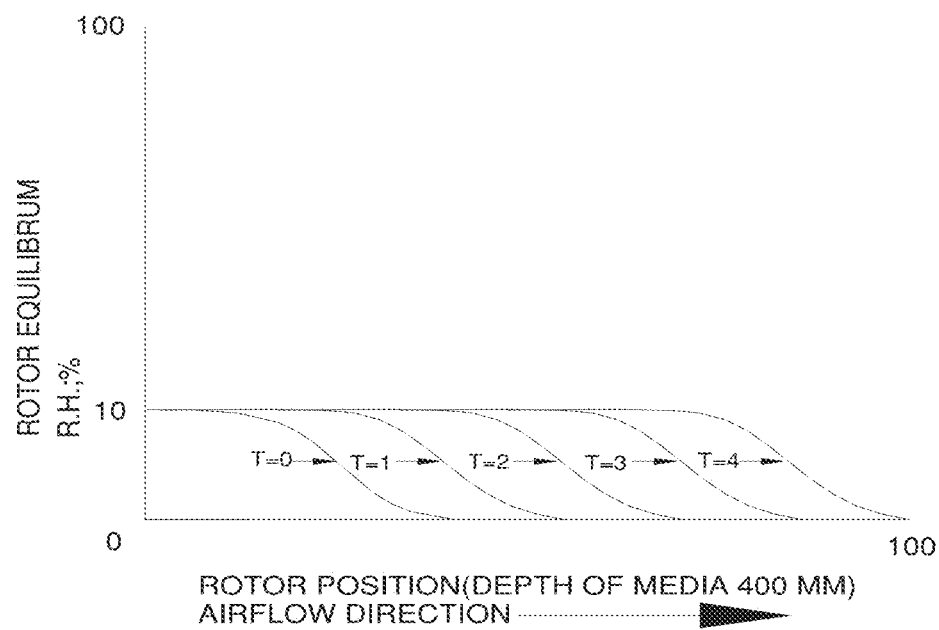
FIG.14 - ADSORPTION WAVE-PROCESS SECTOR
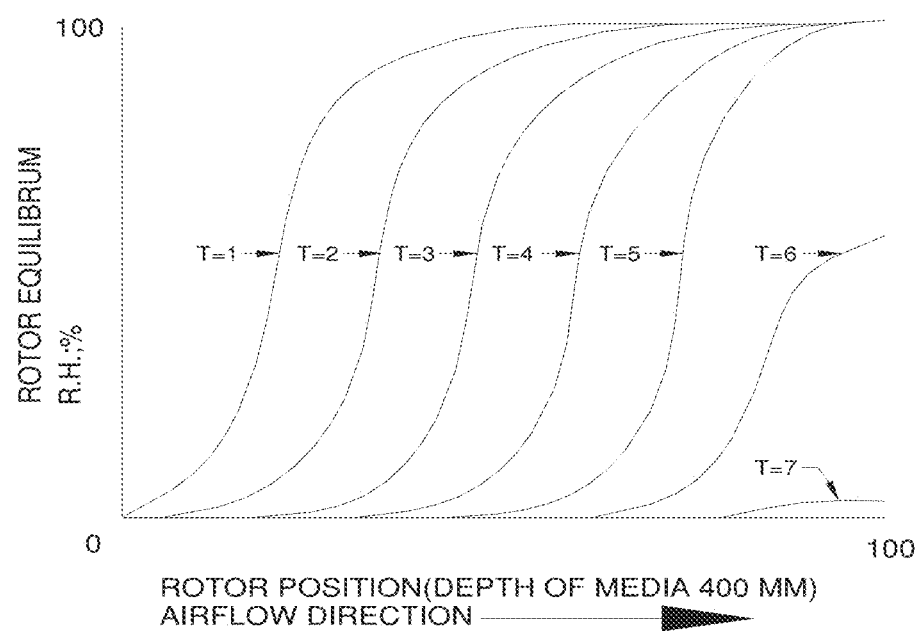
FIG.15 - DESORPTION WAVE - REACTIVATION SECTOR

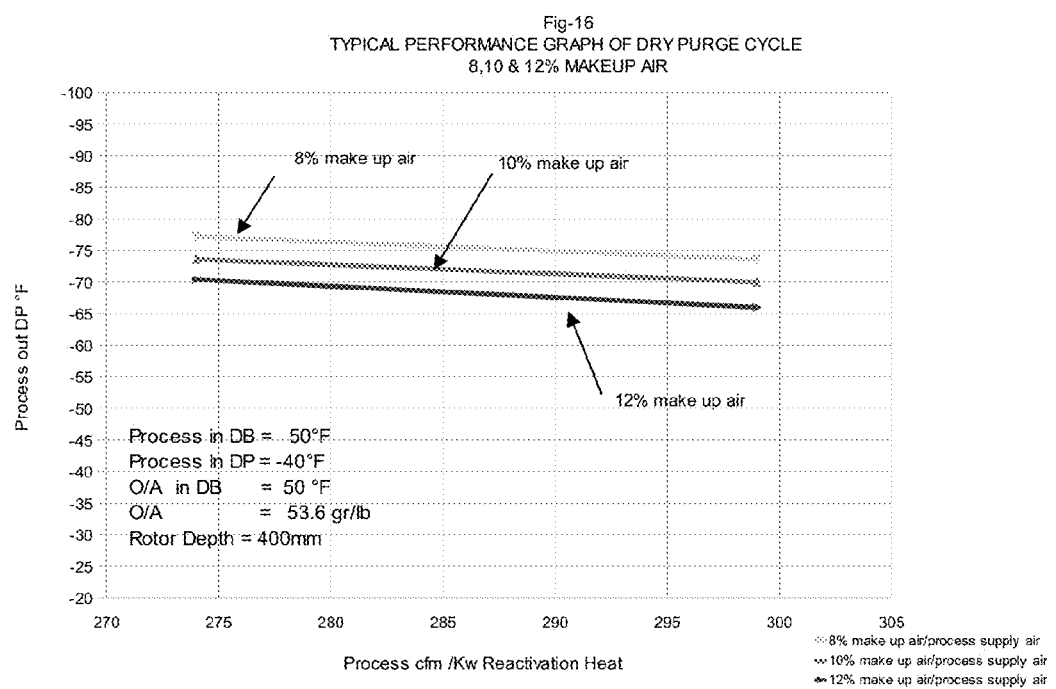

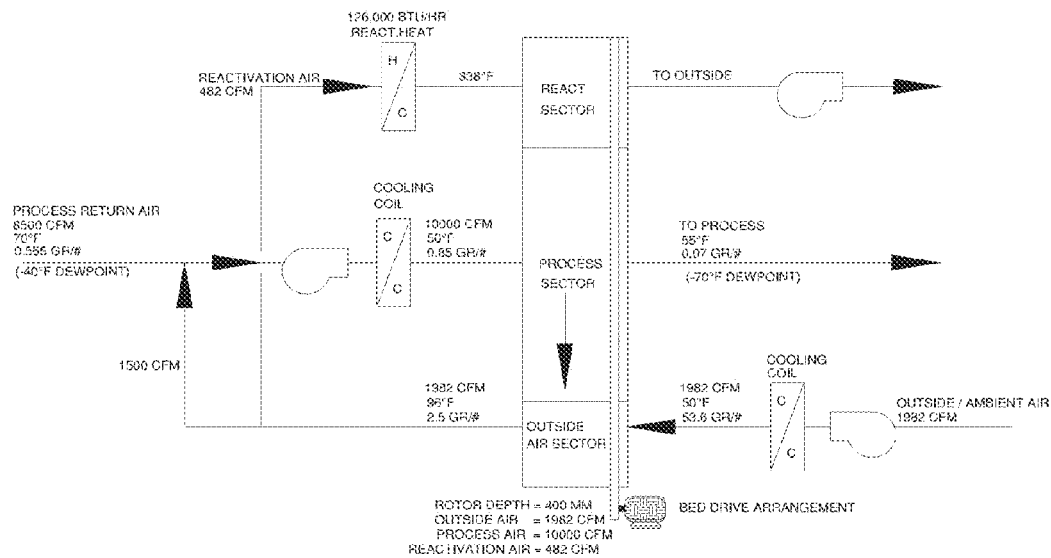
FIG.17(A) - TYPICAL PERFORMANCE OF DRY PURGE CYCLE
15% PRESSURIZATION / MAKEUP AIR
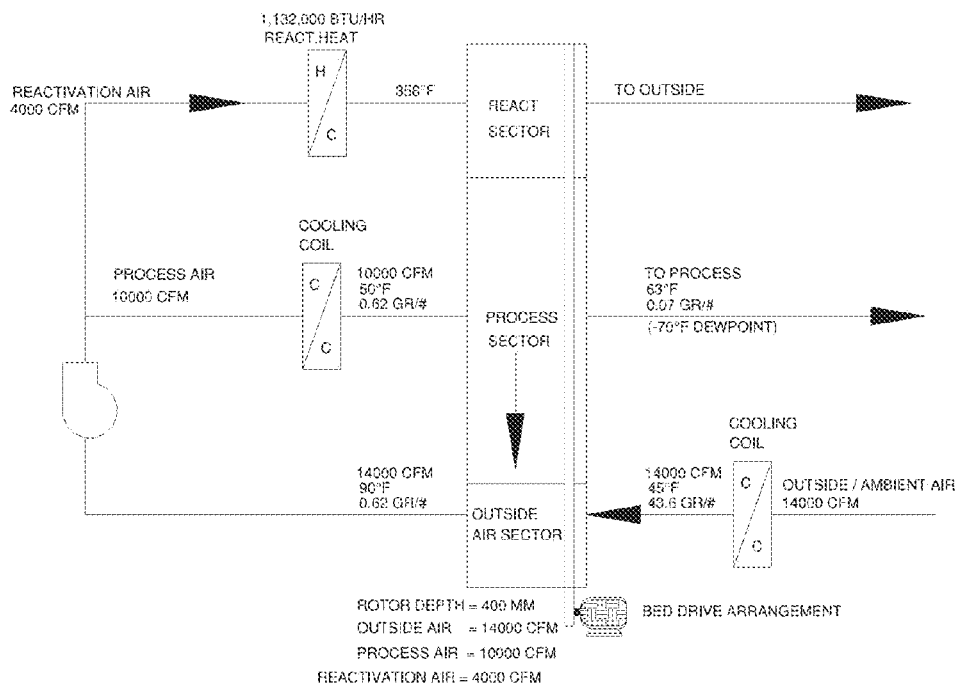
FIG.17(B) - TYPICAL PERFORMANCE OF DRY PURGE CYCLE
100% PRESSURIZATION / MAKEUP AIR

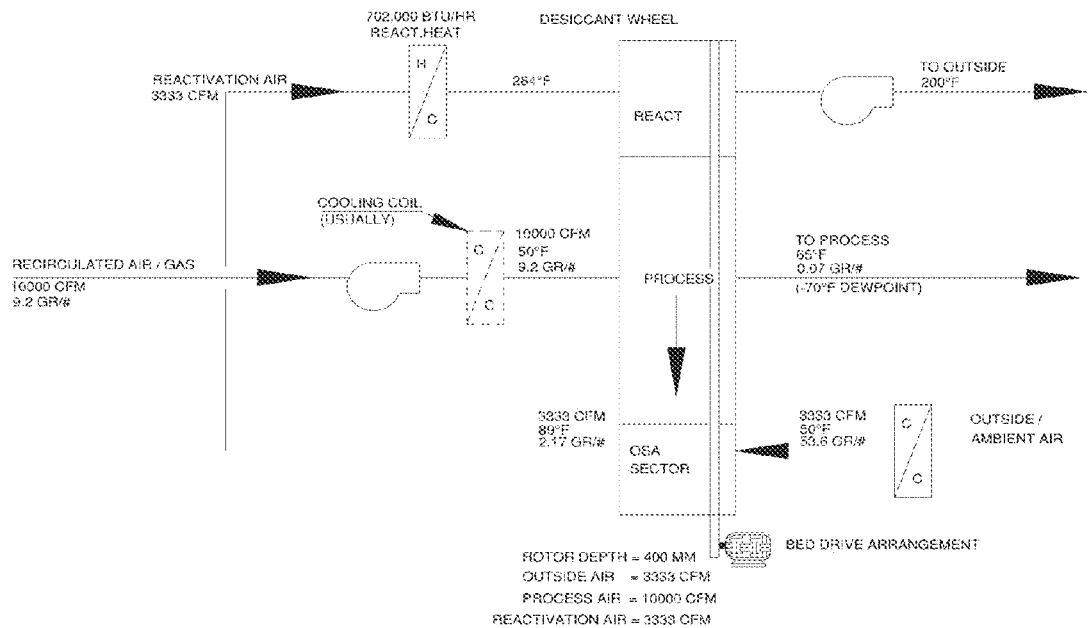
FIG.17(C) - DRY PURGE CYCLE WITH RECIRCULATED AIR / GAS
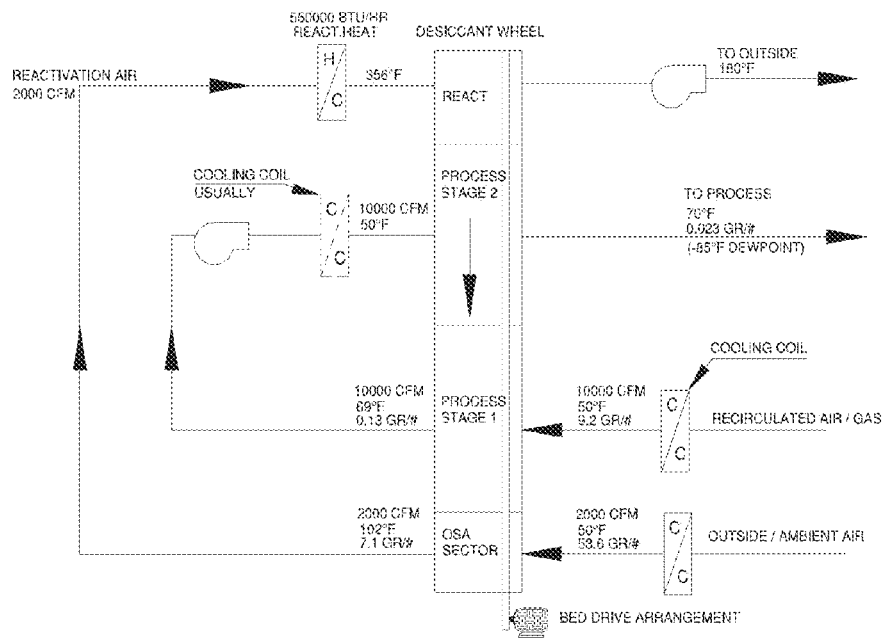
FIG.17(D) - DRY PURGE CYCLE WITH RECIRCULATED AIR / GAS.

SYSTEM AND METHOD FOR IMPROVING THE PERFORMANCE OF DESICCANT DEHUMIDIFICATION EQUIPMENT FOR LOW-HUMIDITY APPLICATIONS

FIELD OF THE INVENTION

This invention relates generally to equipment that uses a solid desiccant material to remove moisture from air or other gases. It relates more specifically to thermally-reactivated desiccant dehumidifiers that use a rotating matrix or wheel containing a solid desiccant material to continuously dehumidify a stream of air or other gas. It relates more specifically still to thermally-reactivated desiccant dehumidifiers that are required to continuously deliver air or other gas to a space or process at very low humidity content, such as 0.1 grain moisture per pound of dry air (0.0143 grams moisture/Kg of dry air) or less. In these applications as much dry air as possible is typically re-circulated from the space or process back through the dehumidifier to minimize the moisture load on the dehumidifier, but some amount of air from a more humid source such as outside air or air from the surrounding plant is usually needed to pressurize the space or process to prevent leakage of air from more humid surrounding areas into the space or process, and/or to make up for air that may need to be exhausted from the space or process to provide ventilation air for occupants and/or carry away undesirable vapors, fumes or dust. This pressurization/makeup air must be dehumidified to the same very low humidity content as the rest of the air delivered from the dehumidifier, and even though the makeup air fraction is typically a small percentage of the total airflow through the dehumidifier it usually contributes most of the dehumidification load on the dehumidifier. In extreme cases the dehumidifier must be designed to handle 100% air from more humid areas and still deliver it to the space or process at the same very low moisture content.

While the present application describes equipment and a method for the dehumidification of air, it will be understood by one skilled in the art that the same method and similar apparatus can be applied for the dehumidification of gases other than air, such as an inert atmosphere or natural gas.

DESCRIPTION OF THE PRIOR ART

The use of solid desiccants to dehumidify air is well-known in the art. A discussion of commonly available technology in air dehumidification using desiccants is given below.

FIG. 1 shows the basic elements of a solid desiccant dehumidifier. The dehumidifier contains a rotor (commonly called a wheel 1) that contains a matrix consisting of a large number of small parallel passages disposed axially, so discrete airstreams can be passed through the wheel 1 without significant cross-mixing. The matrix is further characterized by containing a large amount of an adsorbent material such as silica gel or molecular sieve or an absorbent material such as lithium chloride, adhered to or as an integral part of the walls of the passages. The sorbent material is commonly referred to as a desiccant. The passages are typically formed by alternating layers of flat and corrugated substrate material carrying the desiccant. At the current state of development, typically about 80% of the weight of the dry matrix is active desiccant. The desiccant material has an affinity for water and can thus remove moisture from air in contact with it. Consequently, a moist airstream passed through the matrix can be dehumidified.

After a time, the desiccant material will become loaded with water. As the desiccant takes up water, its affinity for water decreases until it will not dehumidify the air at all when it has reached relative humidity equilibrium with the entering moist airstream. The water taken up by the desiccant must be removed. To accomplish this, the desiccant wheel 1 is provided with a housing defining chambers or plenums so two discrete airstreams can be passed through the wheel 1. The housing is equipped with air seals proximate to the wheel 1 faces to effectively prevent leakage or cross-mixing of the airstreams. The housing is also equipped with a means of continuously rotating the wheel 1 so the matrix is alternately exposed to the two airstreams in different areas of the housing, usually called sectors. One of the airstreams is the air to be dehumidified. This is typically called the process air 6. The other airstream is heated 10 to decrease its relative humidity. This is called the reactivation or regeneration airstream 8. When the heated reactivation airstream 8 is passed through the reactivation sector 3 of the wheel 1 it heats 10 the water-loaded desiccant so the water taken up in the process sector 2 evaporates from the desiccant and is carried away by the reactivation airstream 9.

The equilibrium relative humidity vs. moisture capacity of adsorbents such as silica gel and molecular sieve can be tailored for various types of applications by controlling the chemistry of the manufacturing process. The general characteristics of the various types of adsorbents are described in the 2009 ASHRAE Fundamentals Handbook.

FIG. 2 (taken from the ASHRAE Fundamentals handbook) shows the general shape of the moisture capacity vs. equilibrium R.H. curves of desiccants that are commonly used. These moisture content vs. equilibrium R.H. curves are commonly called isotherms. For low R.H. applications, desiccants with the Type 1 isotherm are usually used because they can be tailored to achieve practically all their sorptive capacity at equilibrium relative humidities below about 10%. A Type 1 adsorbent is consequently well-suited for applications where the process air entering the dehumidifier is at a low relative humidity but it has two disadvantages:

1. The heat of sorption increases as the equilibrium R.H. decreases, so at low equilibrium relative humidities the heat rejected to the process air 6 per unit of moisture adsorbed increases substantially. This usually increases the cooling load on the process air conditioning equipment downstream of the dehumidifier. Furthermore, the higher heat of sorption causes the temperature of the media in the process sector 2 to be higher, reducing its ability to dehumidify the process air 6.
2. The relative humidity of the reactivation air 8 must be lower to drive the water out of the desiccant, so the reactivation air 8 must be heated to higher temperatures, typically in the range of 300 F to 320 F compared to 280 F or less for applications that do not require extremely dry air 7. This increases the amount of energy needed to heat the reactivation air 8 and also increases the temperature of the dried media leaving the reactivation sector 3.

Referring now to FIG. 3, for processes requiring an extremely low delivered air dew point, any pressurization/makeup air 6 required is usually cooled using refrigeration to a temperature of 40 F-55 F to remove as much moisture as possible by condensation on the surface of a cooling coil 13. The usually precooled makeup air 6 is then mixed with the process return air 16, and the mixed air 12 is cooled to a temperature of 40-55 F using a cooling coil 14 before entering the process sector 2 to increase its relative humidity and reduce the temperature of the desiccant in the process sector 2, thus increasing the drying capacity of the dehumidifier. The desiccant wheel 1 is actually cylindrical in shape as described earlier, but for simplicity it is shown as a rectangle with various sectors and airflow directions indicated. The arrow inside the rectangle indicates the direction of rotation of the wheel 1, i.e. the sequence that the matrix passes through the various sectors. With the makeup air 6 and process air precooling, at typical makeup air fractions the relative humidity of the air entering the process sector 2 is 20% or less. For lower process air 12 discharge humidity 7 the reactivation inlet air may also be precooled with a cooling coil 11 to reduce its humidity ratio before heating so the heated reactivation air 8 has a lower relative humidity.

The temperature of the dried media leaving the reactivation sector 3 will typically be close to the reactivation entering air temperature (hot), so its equilibrium humidity ratio will be high and it will not dry the air very effectively when it first rotates into the process sector 2 until the process air 12 has cooled the media, thus reducing its equilibrium humidity ratio. Furthermore, the heat removed from the media to cool it will be transferred to the process air 12, increasing the cooling load on process air conditioning equipment located downstream of the dehumidifier. Overall, the effect is to reduce the dehumidifying capacity of the dehumidifier and increase the amount of cooling required by the process air conditioning system. Several methods are currently used to address these issues, improve the dehumidifying capacity of the dehumidifier and reduce the cooling requirements of the process air conditioning system.

It is also known in the art to use at least one additional sector, commonly called a purge sector in a desiccant dehumidifier. U.S. Pat. Nos. 5,667,560 and 2,993,563, U.S. Publication 2009-044555 and Japan Publication 006-00032, GB 890,790, and U.S. Pat. Nos. 5,242,473 and 5,659,974 all disclose the use of one or more purge sectors in desiccant dehumidifiers.

FIG. 4 shows the basic arrangement of a desiccant dehumidifier with at least one additional sector (and currently widely used), commonly called a purge sector. In this arrangement a third airstream (commonly called purge air 18) is passed through the wheel 1 sequentially between the reactivation sector 3 and process sector 2. The direction of the purge airflow is typically concurrent with the process airflow 12 and countercurrent to the reactivation airflow 20. The source of the purge air 18 may be a portion of the process return air 16 or air from another source, such as air passed through the precooling coil 13 for the pressurization/makeup air 6. The purge air 18 cools the hot media leaving the reactivation sector 3 before it enters the process sector 2 so it rejects less heat to the process air, decreasing the cooling load on the downstream process air cooling equipment. The cooler media entering the process sector 2 also improves its dehumidification performance. The purge air 18 is heated while passing through the wheel 1 and usually is used for at least a portion of the reactivation inlet air, reducing the heat input required for reactivation 10. In addition, the purge air 18 may be dehumidified somewhat, reducing the humidity of the reactivation entering air 20 and further improving the performance of the dehumidifier. The use of one or more purge sectors in several different configurations to improve dehumidifier performance is well-known in the prior art.

FIG. 5 shows another arrangement currently used to improve the dehumidification performance and energy efficiency of desiccant dehumidifiers. This arrangement includes a closed-loop purge. In this arrangement, the sectoring is sequentially process 2/purge-17*a*/reactivation-3/purge-17*b*. The purge air 24, 23 is circulated in a closed loop between the two purge sectors using an independent fan 25. The purge air 24 precools the media leaving the reactivation sector 3 before it enters the process sector 2 and uses the recovered heat to preheat the media leaving the process sector 2 before it enters the reactivation sector 3. More than one closed purge loop may be used under some circumstances such as to handle high air pressure differentials between the process 2 and reactivation airstreams 8 or to prevent frost from forming in some portion of the desiccant unit or matrix. Usually only one purge loop is used due to the increased size, cost and complexity of multiple purge loops. This arrangement accomplishes basically the same objectives as the arrangement shown in FIG. 4, but does not require another air source for the purge air. Japan Publication #59-130521, GB 0890,790, WO 2009/090492 A2, U.S. Pat. Nos. 5,659,974, 2,993,563 and 7,101,414 B2 are typical examples of this arrangement. Although not shown in FIG. 5, the purge loop may be vented to a particular plenum in the dehumidifier housing and the purge recirculating fan 25 located to create favorable static pressure balances between sectors of the housing so any air leakage that may occur between plenums or sectors will have little or no effect on the overall performance of the dehumidifier. The air flow in the purge loop may be in either direction, depending on the specifics of the application. U.S. Pat. No. 4,701,189 shows several arrangements with the purge loop in communication with the process and/or reactivation airstreams.

Even with the performance enhancements described in FIGS. 4 and 5 (and the cited patents), the dehumidifier may still not be capable of delivering air at a sufficiently low humidity.

FIG. 6 shows yet another arrangement commonly in current use, which uses two dehumidifiers in series to address the high makeup/pressurization air fractions and/or extremely low humidities required for some applications. In these arrangements a separate dehumidifier unit is used to pre-treat the pressurization/makeup air 31 and reduce the humidity load on the downstream process load dehumidifier. When using this arrangement for large applications one dehumidifier typically pre-dehumidifies the pressurization/makeup and reactivation air 26 for a plurality of room or process air dehumidifiers. Japan Pub. #61-071821 and U.S. Pat. Nos. 5,167,679, 7,207,123 B2 and 7,217,313 B2 are all examples of systems using two dehumidifiers in series. The concept is well-known and other configurations using two wheels 1 in series are commonly used.

The significant disadvantages associated with the known art are the complexity of the systems provided, and the increased energy expense that is involved. These disadvantages point out the need for a system that is not only functionally efficient but is also cost-effective.

OBJECTS OF THE CURRENT INVENTION

An object of the current invention is to enable desiccant units to deliver dry air to a room or process while achieving energy efficiency better than the current state of the art as described above.

A further object of the current invention is to enable a desiccant unit with a single wheel to deliver drier air to a process with up to 100% outside air fraction compared to current technologies as described earlier.

A still further object of the current invention is to enable desiccant units to deliver 100% outside air or gas to processes requiring air or gas at humidities as low as −70 F dewpoint or lower with a single desiccant wheel.

Another object of the current invention is to achieve the above performance objectives with a unit and housing design that is simple and inexpensive to build and simple to control.

BRIEF DESCRIPTION OF THE DRAWINGS OF THE CURRENT INVENTION

FIG. 1 shows basic elements of a conventional solid desiccant dehumidifier.

FIG. 2 shows the general shape of the moisture capacity vs. Equilibrium R.H. curves of conventional desiccants.

FIG. 3 shows the basic arrangement a conventional dry desiccant dehumidifier for low humidity applications.

FIG. 4 shows the basic arrangement of a desiccant dehumidifier with at least one additional sector (purge sector).

FIG. 5 shows another conventional arrangement used to improve the dehumidification performance and energy efficiency of desiccant dehumidifiers.

FIG. 6 shows yet another conventional arrangement which uses two dehumidifiers in series to address the high makeup/pressurization air fractions and/or extremely low humidities required for some applications.

FIG. 7 is a schematic of the current invention, which may be referred to as 'Dry Purge' throughout the description, configured to dehumidify a mixture of recirculated process air 16 and makeup/pressurization air 36.

FIG. 7a is a schematic of the current invention as described in FIG. 7 except a purge sector 17 has been added sequentially between the reactivation sector 3 and process sector 2. The air leaving the purge sector 37 may be used for at least a portion 8 of the reactivation inlet air 20. This will further improve the dehumidification performance and energy efficiency of the unit.

FIG. 8 is a schematic of the current invention configured to dehumidify air for processes requiring 100% outside air 34 for makeup/pressurization, i.e. no air is recirculated from the space or process.

FIG. 8a is a schematic of the current invention as described in FIG. 8 except a purge sector 17 has been added sequentially between the reactivation sector 3 and process sector 2. This will further improve the dehumidification performance and energy efficiency of the unit.

FIG. 9 is a schematic of the current invention configured to dehumidify air or other gas 16 wherein the process air 7 is isolated from the outside/ambient air 34, which is pre-dehumidified in the OSA sector 33 before being heated 10 and passing through the reactivation sector 3. The process air may be air or other gas recirculated from a process, air or gas from another source, or a mixture of the two. It should be noted that process air or gas may be passed through the process sector in either direction.

The above schematic of the current invention is configured to handle the process air completely independently of the reactivation air and outside/ambient air sectors, providing the opportunity to dehumidify an inert gas (such as a low-oxygen process air) using ambient air for reactivation.

FIG. 9a is a schematic of the current invention as described in FIG. 9 except a purge sector 17 has been added sequentially between the reactivation sector 3 and the process sector 2, to improve the dehumidification performance and energy efficiency of the unit. The purge air 37 may be recycled 8 to form a portion of the reactivation inlet air 20, reducing the heat input 10 required for reactivation.

FIG. 10 is a schematic of the current invention, similar to FIG. 9, except with two process sectors sequentially following the reactivation sector, with the process air passed sequentially through the two process air sectors for improved dehumidification performance. It should be noted that the process air or gas may be passed through the two process sectors in either sequence after the reactivation sector and in either direction relative to the reactivation and outside air flows.

FIG. 10a is a schematic of the current invention as described in FIG. 10 except a purge sector 17 has been added sequentially between the reactivation sector 3 and the process sector 2, to improve the dehumidification performance and energy efficiency of the unit. The purge air 37 may be recycled 8 to form a portion of the reactivation inlet air 20, reducing the heat input 10 required for reactivation.

FIG. 11a is a schematic of the current invention configured with two reactivation sectors 3 & 40, permitting different heat sources 10 and 41 to be used for each of the reactivation airstreams 20 and 42, and also configured to dehumidify a mixture of recirculated air or gas 16 from the space or process and makeup/pressurization air that has been dehumidified in the outside air sector 33.

FIG. 11b is a schematic of the current invention similar to FIG. 11a except it is configured to deliver 100% outside air or gas to the space or process 7.

FIG. 11c is a schematic of the current invention similar to FIG. 11a except it is configured to dehumidify an independent air or gas stream 16 in a single process sector 2. The source of the process air or gas stream may be ambient, recirculated air or gas from the space or process, or any mixture thereof.

FIG. 11d is a schematic of the current invention similar to FIG. 11a except it is configured with two process sectors 2 and 44 to dehumidify the process air or gas with two passes through the wheel. The process air or gas may be ambient, recirculated air or gas from the process, or any mixture thereof.

It should be understood that the two reactivation airstreams 20 and 42 in FIGS. 11a through 11d need not be from the same source, for example the air or gas for reactivation sector 1 may be taken from ambient and the air or gas for reactivation sector 2 taken from the p[reconditioning sector 33.

FIG. 12 is a sketch of an isotherm for a desiccant having Type II characteristics, i.e. good but limited moisture adsorption capacity at low relative humidities and good moisture adsorption capacity at mid-range and high relative humidities.

FIG. 13 is a graph showing how the adsorption wave moves through the OSA (pressurization/Makeup air) sector 33 of the current invention over time as the wheel 1 rotates through the sector.

FIG. 14 is a graph showing how the adsorption wave moves through the process air sector 2 of the current invention over time as the wheel 1 rotates through the sector.

FIG. 15 is a graph showing how the desorption wave moves through the reactivation sector 3 of the current invention over time as the wheel 1 rotates through the sector.

FIG. 16 is a graph that shows the general relationship of process delivered air dewpoint and reactivation air heat requirements and it also shows the general effect of increasing the makeup air fraction on reactivation air heat requirements using the present invention.

FIGS. 17a and 17b are schematics of the current invention showing typical performance for an application requiring extremely dry air, such as lithium battery manufacturing, requiring the manufacturing space to be maintained at −40 F dewpoint (0.555 grains water/lb air). Typical delivered air conditions are −70 F dewpoint (0.073 grains water/lb air) or lower. FIG. 17a shows the performance of a unit designed to handle 15% pressurization/makeup air and 85% recirculated air from the manufacturing area, which is typical for these applications. FIG. 17b shows the performance for an extreme case, where the dehumidifier must deliver 100% outside air at −70 F dewpoint. At the current state of the art, the current invention is the only practical apparatus that can deliver 100% outside air at −70 F dewpoint or lower.

FIGS. 17c and 17d are schematics of the current invention showing typical performance for plastic resin drying, another common application of desiccant dehumidifiers requiring very dry air (around −70 F dewpoint) delivered to the resin hoppers. Two different configurations of the present invention are shown. In these applications the process air is as close as practical to 100% recirculated air. FIG. 17c shows the performance of a unit of the current invention with a configuration as shown in FIG. 9, i.e. with a single process air sector. FIG. 17d shows the performance of the current invention with a configuration as shown in FIG. 10, i.e. with two process air sectors. As can be seen from the figures, both configurations provide superior performance; the configuration shown in FIG. 17d clearly is more energy efficient but the configuration shown in FIG. 17c will be smaller and less expensive to build.

DETAILED DESCRIPTION OF THE INVENTION

FIG. 7 is a schematic representation of the current invention configured to dehumidify a mixture of return (or recirculated) air 16 from a low-humidity space or process and outside air 36 for pressurization/makeup. The arrow inside the desiccant wheel indicates the sequence in which the wheel 1 rotates through the sectors, i.e. it rotates sequentially through the reactivation 3, process 2 and outside air 33 (or preconditioning) sector, and then back to the reactivation sector 3.

FIG. 7A is similar to FIG. 7 except a purge sector 17 has been added sequentially between the reactivation sector 3 and the process sector 2. The purge sector precools the desiccant media leaving the reactivation sector before it enters the process sector, improving the dehumidification performance of the unit and decreasing the reactivation heat carryover from the reactivation to the process sector. The purge discharge air 37 may be recycled to form at least a portion of the reactivation supply air 20, reducing the reactivation heat requirements 10 and further improving the overall energy efficiency of the dehumidifier.

FIG. 8 is another schematic representation of the current invention configured to handle 100% outside air 34 and still deliver air to the process at −70 F dewpoint or less. Please note that with proper balancing dampers this configuration can be made to operate with a single fan 39 for the entire dehumidifier.

The invention has three unique configuration characteristics that have not been found in the prior art. These characteristics are:

1. The dehumidifier includes two sectors for treating the air to be dehumidified. As shown in FIG. 7, the first dehumidification sector 2 is sequentially immediately after the reactivation sector 3 so the desiccant entering it has very low equilibrium relative humidity and consequently can produce very dry air 7. A substantial percentage of the air entering this sector is typically recirculated air 16 from the room or process, which is already very dry, as low as 0.5 grains/lb air or less for processes such as lithium battery manufacturing.

2. The second dehumidification sector 33 is sequentially immediately after the first dehumidification sector 2. It typically handles makeup/pressurization air 34, which is more humid air from outside or from the surrounding plant. This air is usually passed through a refrigerated cooling coil 35 to reduce its temperature and remove as much moisture as possible by condensation before entering the dehumidifier.

Consequently this air is usually at a high relative humidity when it enters the second dehumidification sector 33. In this way, the dehumidifier becomes "two units in one", with the first sector 2 delivering very dry air 7 to the process and the second sector 33 taking up most of the dehumidification load at higher relative humidities, thus substantially improving the thermal efficiency of both the dehumidification and the reactivation processes.

3. All or at least a portion of the air supply to the reactivation sector 3 is taken from dehumidified air 36 exiting the OSA sector 33 so the air entering the reactivation sector 3 after being heated 10 is at a very low relative humidity and consequently the desiccant matrix leaving the reactivation sector 3 is nearly anhydrous. As can be seen from the schematics in FIGS. 7 and 8, passing the process and reactivation airflows 7 & 9 through the wheel 1 concurrently makes the housing much simpler and less expensive to build. For countercurrent flow of process 7 and reactivation air 9 the housing would need to include additional ducting and likely additional fans. In fact, the system schematically shown in FIGS. 8 and 8A shows that a unit handling 100% outside air 34 could be built with a single fan 39 for the entire unit.

In the reactivation sector 3 the desiccant is dried to an essentially anhydrous state.

FIG. 9 shows another configuration of the current invention in which the process air or gas stream 16 is completely independent of the other airstreams, and the outside air sector 33 is used only to dehumidify the air supply 20 to the reactivation sector 3. With this arrangement the desiccant is dried to a nearly anhydrous state in the reactivation sector 3 so the process sector 2 can produce drier air. The process air may be air or other gas recirculated from a process, air or gas from another source, or a mixture of the two. It should be noted that process air or gas may be passed through the process sector in either direction.

The above schematic of the current invention is configured to handle the process air completely independently of the reactivation air and outside/ambient air sectors, providing the opportunity to dehumidify an inert gas (such as a low-oxygen process air) using ambient air for reactivation.

FIG. 9a is the same as the configuration as that shown in FIG. 9 but a purge sector 17 has been added sequentially between the reactivation sector 3 and the process sector 2 to cool the hot media leaving the reaction sector 3, improving the dehumidification performance of the unit. The air from the purge sector 37 has been heated by the hot media and is usually recycled to the reactivation inlet air 8, reducing the air heating 10 required for the reactivation inlet air.

FIG. 10 is an arrangement similar to FIG. 9 in that the process air or gas stream 16 is completely independent of the other airstreams but the unit is configured so there are two process sectors 44 and 2, and the process air passes through the wheel twice, enabling the unit to produce drier air.

FIG. 10a is the same configuration as FIG. 10 but a purge sector 17 has been added sequentially between the reactivation sector 3 and the process sector 2 to cool the hot media leaving the reactivation sector 3, improving the dehumidification performance of the unit. The air from the purge sector 37 has been heated by the hot media and is usually recycled to the reactivation air inlet 8, reducing the air heating 10 required for the reactivation inlet air.

FIGS. 11a-11d show other arrangements of the current invention. In these arrangements the dehumidifier includes more than one reactivation sector. Each sector may be supplied with air from a different source. For example, in a unit with two reactivation sectors 3 and 40 the matrix entering the first reactivation sector 3 will be nearly saturated with moisture because it has just left the high-humidity outside air sector 33 and become loaded with moisture to nearly its full adsorption capacity. This means that most of the adsorbent reactivation can be accomplished using ambient air 20 and an inexpensive heat source 10 such as direct-fired natural gas. When most of the moisture has been driven from the matrix with ambient air 20 and a low-cost heat source, the media can be subjected to final drying in a second reactivation sector 40 using a small amount of air 42 from the outside/ambient air sector 33 and electric heat or a similar heat source 41 which heats the reactivation air 42 but adds no humidity, so the desiccant leaving the second reactivation sector 40 will be essentially anhydrous.

Focusing now on the adsorbent characteristics and operating cycle of the current invention, the following information is provided:

FIG. 12 is an isotherm for a desiccant ideally suited for the current invention, i.e. it generally has type II isotherm and it has a moisture adsorption capacity of about 5 to 20% of its total capacity at 10% or less relative humidity, but its remaining adsorptive capacity is distributed up to 100% relative humidity with a bias toward the higher relative humidities so the total average heat of sorption is minimized for the highest thermal efficiency.

The following figures conceptually show how the adsorption and desorption processes occur as a function of time through the dehumidifier matrix during continuous operation. The time numbers indicated are not intended to show the actual times for a specific application but are intended to show how the adsorption/desorption waves move through the matrix during operation. The actual times, size of rotor sectors, rotor speed and air mass flow rates through each sector vary depending on the application. We have found that the optimum rotor speeds are quite low for low-humidity applications such as lithium battery assembly rooms, ranging from 2 to 3 revs/hr for units handling 100% outside air to less than 0.5 revs/hr for units handling 90% return air for the process and 10% makeup/pressurization air.

FIG. 13 shows how the adsorption wave passes through the depth of the matrix (typically 400-500 mm) in the second adsorption sector of the wheel. The sector size and rotational speed of the wheel are selected so nearly all the discharge air from this sector has been deeply dehumidified, and the adsorption wave is just beginning to "break through" on the discharge air side of the wheel. The air entering this sector is typically air from outside or the surrounding plant and it is usually precooled so it is at or near saturation and the adsorption process is thermally efficient. Air face velocities in the 400 to 500 ft/min range are typical.

FIG. 14 shows how the adsorption wave passes through the matrix in the first adsorption sector of the wheel (the process air sector). The air entering this sector is usually a mixture of return air from the room or process and pressurization/makeup air that has already been dehumidified in the second adsorption sector. The relative humidity of this air is a function of the humidity maintained in the room or process and the ratio of process return air to pressurization-makeup air. Even with no process return air (100% outside air) the relative humidity of the air entering this sector is less than 10% and is usually much lower depending on the percentage of process return air and its humidity. For applications such as lithium battery assembly the relative humidity of the air entering this sector is typically about 1% RH. For the lowest possible dewpoint the sector size and air face velocity are selected so the adsorption wave is just short of breaking through the matrix discharge air face. Typical face velocities in this sector are in the 400 to 500 ft/min range.

FIG. 15 shows how the desorption wave passes through the reactivation sector of the wheel. In addition to having two process air sectors there are two other unique characteristics of this invention compared to the prior art:

1. The airflow in the first process sector and the reactivation sector are concurrent, i.e. in the same direction. This is not intuitive at all to those skilled in the art because the best performance of a dry desiccant dehumidifier is usually achieved when the airflow in the process and reactivation sectors are countercurrent to each other. This could be done with the current invention but it can be readily seen by looking at FIGS. 7 and 8 that the unit housing would require additional interior ducting and would be more difficult and expensive to manufacture. However, the wheel 1 passes sequentially though the process sector, the makeup/pressurization sector and then the reactivation sector. The great majority of the dehumidification load is adsorbed in the OSA/makeup/pressurization sector so the matrix leaves this sector with a high water loading, and this sector is in counterflow with the reactivation airstream. This significantly improves the thermal efficiency of the dehumidification process because most of the adsorbed moisture is taken from the high-RH makeup/pressurization airstream, and most of the desiccant drying in the reactivation sector occurs at the higher equilibrium RH associated with the adsorption process. As discussed previously, the heat of sorption increases exponentially upward as the equilibrium relative humidity decreases. At least a portion of the reactivation air has been pre-treated by the pressurization-makeup air sector, greatly reducing its humidity ratio so at least the final portion of the reactivation sector is supplied with very dry air. This enables the reactivation sector to dry the desiccant to an essentially anhydrous state. The anhydrous nature of the matrix enables it to dry the process air to an extremely low dewpoint with little dehumidification load because its makeup air has already been dried in the makeup/pressurization air sector. This sector will carry the bulk of the dehumidification load because the air entering it will typically be at or near saturation most of the time, depending on the climate.

2. We have found that lower air face velocities are required in the reactivation sector to assure that the matrix is dried to an essentially anhydrous state throughout its entire depth. In general, face velocities in the range of 150-400 ft/min, more specifically 150-250 ft/min, provide the best thermal efficiency.

With the configurations of the current invention described above, the temperature of the matrix leaving the last reactivation sector will be close to the reactivation air temperature entering the last reactivation sector throughout the entire depth of the wheel. As described earlier, optimum performance with the current invention is achieved at low rotational speeds, typically ranging from 2 to 4 revs/hr for units handling 100% outside air for the space or process to 0.5 revs/hr or less for units handling 90% return air at 70 F and −40 F dewpoint and 10% outside air 34 precooled to about 50 F dry bulb temperature or saturation. Because of the low rotational speed of the wheel the reactivation heat carryover from reactivation to process is relatively low, but it can be significantly reduced by using a very small purge sector sequentially between the reactivation and process air sectors. This is schematically shown in FIGS. 7a, 8a, 9a, and 10a. It may be only a few degrees in size and use a small amount of air but the net reduction in cooling required may be significant.

FIG. 16 shows typical performance of a dehumidifier in the Dry Purge configuration using a matrix having a desiccant isotherm similar to that shown in FIG. 10. The vertical scale shows the dewpoint humidity of the process discharge air and the horizontal scale shows the reactivation heat requirements in units of process air discharge volume in CFM per Kw (thermal) heat required for reactivation. The lines show the performance at 8%, 10% and 12% makeup/pressurization air fraction. The operating parameters of the unit are shown in the lower left corner of the diagram. For example, with a 10% makeup/pressurization air fraction the dehumidifier can deliver about 300 CFM of process air per Kw (thermal) reactivation energy requirement, with 90% of the process inlet air being return air from the process at −40 F dewpoint humidity. The reactivation heat input is equal to or less than that required by currently available dehumidifiers, with a simpler and less expensive equipment design.

FIGS. 17 a&b illustrate typical performance of a dehumidifier in the Dry Purge configuration for very dry rooms or processes (such as lithium battery manufacturing) in two different situations—the upper diagram for an application requiring 15% pressurization/makeup air and the lower diagram for an application requiring 100% outside air. In both cases the unit is required to deliver 10,000 CFM of air to the process at −70 F dewpoint or less. These conditions were chosen to demonstrate the ability of Dry Purge units to deliver extremely dry process air at any makeup air fraction from 0% to 100%. For the upper diagram the return air conditions are typical of lithium battery production rooms. In the upper example (15% makeup air) the unit has a reactivation specific heat energy input of about 1,790 BTU/lb of water removed from the air by the dehumidifier. In the lower example (100% makeup air) the reactivation specific heat energy input is about 2,950 BTU/lb of water removed from the air by the dehumidifier. We believe this performance provides energy efficiency equal to or better than any other configuration currently known to the art for applications requiring extremely dry air for a space or process.

FIGS. 17c&d illustrate the performance of a dehumidifier in the Dry Purge configuration for another general class of applications requiring very dry delivered air conditions but having higher inlet or return air humidity. A good example is plastic resin pellet drying, which requires air delivered to the drying hopper at about −70 F dewpoint. These applications are normally 100% recirculated air and the return air humidity from the drying hopper is typically about 8 to 10 grains moisture/lb air. In these situations the Dry Purge configuration must be modified somewhat to accommodate the 100% process air recirculation. FIG. 17c shows a Dry Purge configuration using a single process sector and using the outside air sector to provide all the air for the reactivation sector, thus creating a very low relative humidity for the reactivation inlet air at temperatures of about 285 F. Another approach is shown in FIG. 17d, wherein the process air is passed though two process sectors in series. As can be seen from comparing the reactivation heat requirements, the configuration shown in FIG. 17d is more efficient thermally, but requires a larger unit.

It should be noted that the performance shown is at the concept's current state of development. It is expected that performance will significantly improve with further development and testing of the desiccant isotherm and the air mass flows, sector sizes, etc, which is currently underway. It should also be noted that the discussion in this disclosure has been focused on applications that require extremely dry air, but there may be other applications of the concept disclosed that will provide superior performance in higher humidity applications.

We claim:

1. Dehumidifier apparatus of the solid desiccant type comprising a desiccant wheel (1) and wheel drive, a housing with internal baffles and air seals proximate to the wheel face to create plenums or sectors and prevent air from leaking between adjacent sectors, to create three paths for air to pass through the wheel; the sectors being sequentially a reactivation sector (3) to dry the desiccant to a low equilibrium relative humidity, a process sector (2) to dry return air from the process and makeup air received from an outside air sector (33), the outside air sector (33) to dehumidify another airstream (34), to provide makeup air (36) for the process sector (2) and all the air for the reactivation sector (3).

2. Dehumidifier apparatus according to claim 1 wherein said desiccant wheel (1) is positioned such that the process airflow and the reactivation airflow pass through the desiccant wheel in the same direction and the outside airflow and reactivation airflow pass through the desiccant wheel in opposite directions.

3. Dehumidifier apparatus according to claim 1 in which the process airflow and the outside airflow both pass through the wheel in a direction opposite that of the reactivation airflow.

4. Dehumidifier apparatus according to claim 1 wherein means (35) are provided to precool the air entering the outside air sector (33) to remove some of the water from the air by condensation and deliver the air to the outside air sector (33) at a relative humidity near saturation.

5. Dehumidifier apparatus according to claim 1 wherein means (14) are provided to precool the air entering the process air sector (2), thus increasing the relative humidity of this air to improve the dehumidification performance and reduce the temperature of the air delivered from the process sector (2).

6. Dehumidifier apparatus according to claim 1 wherein an additional "purge" sector (17) is disposed sequentially between the reactivation (3) and process (2) sectors, thereby increasing the total number of sectors to four, the supply air for this sector being taken from the discharge of the outside air sector (33) or the inlet to the process sector (2), precooling the media leaving the reactivation sector (3) before it enters the process sector (2), enabling the dehumidifier to produce drier process air and reducing the heat carryover from reactivation to the process air.

7. Dehumidifier apparatus according to claim 6 wherein the air leaving the purge sector (17) is used for at least a portion of the reactivation inlet air.

8. Dehumidifier apparatus according to claim 1 wherein two reactivation sectors (3, 40) are disposed sequentially before the process air sector (2) permitting different air sources and different heat sources to be used for the two sectors, the supply air for the first reactivation sector (3) being ambient air which may be precooled to reduce the moisture content before being heated, and the supply air for the second reactivation sector (40) being process inlet air or discharge air from the outside air preconditioning sector (33) and a heating means (41) adding no moisture to the air.

9. A dehumidifier apparatus according to claim 1 wherein the another airstream (34) is ambient air.

10. Dehumidifier apparatus of the solid desiccant type comprising a desiccant wheel (1) and wheel drive, a housing with internal baffles and air seals proximate to the wheel face to create plenums or sectors and prevent air from leaking between adjacent sectors, to create three paths for air to pass through the wheel; the sectors being sequentially a reactivation sector (3) to dry the desiccant to a low equilibrium relative humidity, a process sector (2) receiving all its inlet air from the outside air sector (33), and an outside air sector (33) to dehumidify another airstream (34), to provide pre-dehumidified air for the process sector (2) and all the supply air (36) needed for the reactivation sector (3).

11. Dehumidifier apparatus of the solid desiccant type having a desiccant wheel (1) and wheel drive, a housing with internal baffles and air seals proximate to the wheel face to create plenums or sectors and prevent air from leaking between adjacent sectors, to create four paths for air to pass through the wheel (1); the sectors being sequentially two reactivation sectors (3, 40) to dry the desiccant to a low equilibrium relative humidity, second and first process sectors (2, 44) to dry an independent air and/or gas stream which is sequentially passed through the two process sectors in opposite directions and may be recirculated from a space or process, ambient air, or a mixture of the two, and an outside air sector (33) to dehumidify another airstream (34) to provide all the air for the reactivation sectors (3, 40), the two reactivation sectors (3, 40) being disposed sequentially before the second process air sector (2), permitting different air sources and different heat sources to be used for the two sectors, the supply air (20) for the first reactivation sector (3) being ambient air which may be precooled to reduce the moisture content before being heated, and the supply air (42) for the second reactivation sector (40) being discharge air from the outside air preconditioning sector (33) and/or the purge sector (17), and a heating means (41) adding no moisture to the air.

12. Dehumidifier apparatus according to claim 11 wherein means (45, 14) are provided to precool the air entering the first and/or second process air sector (44, 2), thus increasing the relative humidity of this air to improve the dehumidification performance and reduce the temperature of the air delivered from the second process sector (2).

13. Dehumidifier apparatus according to claim 11 wherein said desiccant wheel (1) is positioned such that the second process airflow (7) and the reactivation airflow (9) pass through the desiccant wheel (1) in the same direction and the outside airflow (36) and reactivation airflow (9) pass through the desiccant wheel (1) in opposite directions.

14. Dehumidifier apparatus according to claim 11 in which the second process airflow (7) and the reactivation airflow (9) pass through the wheel in opposite directions and the outside airflow (36) and reactivation airflow (9) pass through the wheel (1) in opposite directions.

15. A method for the dehumidification of air, said method comprising forming three air paths in a dehumidification apparatus, drying a desiccant wheel provided in said apparatus in a reactivation sector (3) to a low equilibrium relative humidity, drying return air from a process sector (2) and makeup air from an outside air sector (33), drying another airstream (34) in the outside air sector (33) to provide makeup air for the process sector (2) and all the air for the reactivation sector (3).

16. A method according to claim 15 wherein the process airflow (7) and the reactivation airflow (9) pass through the desiccant wheel (1) in the same direction and the outside airflow (34) and reactivation airflow (9) pass through the desiccant wheel (1) in opposite directions.

17. A method according to claim 15 wherein the process airflow (7) and the outside airflow (34) both pass through the wheel in the opposite direction as the reactivation airflow (9).

18. A method according to claim 15 wherein the air (34) entering the outside air sector (33) is precooled to remove some of the water from the air by condensation and deliver the air to the outside air sector (33) at a relative humidity near saturation.

19. A method according to claim 15 wherein the air (12) entering the process air sector (2) is precooled to increase the relative humidity of this air to improve the dehumidification performance and reduce the temperature of the air (7) delivered from the process sector (2).

20. A method according to claim 15 wherein an additional "purge" sector (17) is provided sequentially between the reactivation and process sectors (3, 2), thereby increasing the total number of sectors to four, the supply air for this sector being taken from the discharge of the outside air sector (33) or the inlet to the process sector (2), precooling the media leaving the reactivation sector (3) before it enters the process sector (2), thus enabling the dehumidifier to produce drier process air and reducing the heat carryover from reactivation to the process air.

21. A method according to claim 15 wherein two reactivation sectors (3, 40) are disposed sequentially before the process air sector (2), permitting different air sources and different heat sources to be used for the two sectors, the supply air (20) for the first reactivation sector (3) being ambient air which may be precooled to reduce the moisture content before being heated, and the supply air (42) for the second reactivation sector (40) being process inlet air or discharge air from the outside air preconditioning sector (33) and the heating adding no moisture to the air.

22. A method according to claim 15 wherein the another airstream (34) is ambient air.

23. A method according to claim 15 wherein a substantial portion of the dehumidification load is adsorbed in the outside air sector (33) to ensure that the matrix leaves this sector with a high water loading.

24. A method for the dehumidification of air in a dehumidifier apparatus of the solid desiccant type comprising a desiccant wheel (1) and wheel drive, a housing with internal baffles and air seals proximate to the wheel face to create plenums or sectors and prevent air from leaking between adjacent sectors, the method comprising forming three paths for air to pass through the wheel; drying the desiccant to a low equilibrium humidity in a reactivation sector (3), a process sector (2) receiving all its inlet air from an outside air sector (33), dehumidifying another airstream (34) in the outside air sector (33), to provide pre-dehumidified air for the process sector (2) and all the supply air needed for the reactivation sector (3).

25. A method according to claim 24 wherein two reactivation sectors (3, 40) are disposed sequentially before the process air sector (2), permitting different air sources and different heat sources to be used for the two sectors, the supply air for the first reactivation sector (3) being ambient air which may be precooled to reduce the moisture content, and the supply air for the second reactivation sector (40) being discharge air from the outside air preconditioning sector (33) and the air heating adding no moisture to the air.

26. A method for the dehumidification of air in a dehumidifier apparatus of the solid desiccant type having a desiccant wheel (1) and wheel drive, a housing with internal baffles and air seals proximate to the wheel face to create plenums or sectors and prevent air from leaking between adjacent sectors, to create four paths for air to pass through the wheel (1); the sectors being sequentially two reactivation sectors (3, 40) to dry the desiccant to a low equilibrium relative humidity, second and first process sectors (2, 44) to dry an independent air and/or gas stream which is sequentially passed through the two process sectors in opposite directions and may be recirculated from a space or process, ambient air, or a mixture of the two, and an outside air sector (33) to dehumidify another airstream (34) to provide all the air for the reactivation sectors (3, 40), the method comprising forming four paths for air to pass through the wheel (1); drying the desiccant to a low equilibrium humidity in the reactivation sectors, sequentially passing an independent air and/or gas stream in said second and first process sectors in opposite directions to dry said air and/or gas stream the independent air and/or gas stream being selected from air and/or gas recirculated from a space or process, ambient air, or a mixture thereof, dehumidifying another airstream (34) in an outside air sector (33), to provide all the air for the reactivation sectors (3, 40), the two reactivation sectors (3, 40) being disposed sequentially before the second process air sector (2), permitting different air sources and different heat sources to be used for the two sectors, the supply air for the first reactivation sector (3) being ambient air which may be precooled to reduce moisture content before being heated and the supply air for the second reactivation sector (40) being discharge air from the outside air preconditioning sector and an air heating means adding no moisture to the air.

\* \* \* \* \*